US011857942B2

(12) United States Patent
Tramposch et al.

(10) Patent No.: US 11,857,942 B2
(45) Date of Patent: Jan. 2, 2024

(54) SORBENTS FOR REMOVAL OF MERCURY

(71) Applicant: CALGON CARBON CORPORATION, Moon Township, PA (US)

(72) Inventors: Walter G. Tramposch, Moon Township, PA (US); Richard A. Mimna, Oakdale, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 0 days.

(21) Appl. No.: 16/659,120

(22) Filed: Oct. 21, 2019

(65) Prior Publication Data

US 2020/0047155 A1  Feb. 13, 2020

Related U.S. Application Data

(60) Division of application No. 15/368,900, filed on Dec. 5, 2016, now abandoned, which is a continuation of application No. 13/841,315, filed on Mar. 15, 2013, now abandoned.

(60) Provisional application No. 61/658,258, filed on Jun. 11, 2012.

(51) Int. Cl.
| | |
|---|---|
| *B01D 53/64* | (2006.01) |
| *B01J 20/20* | (2006.01) |
| *B01J 20/04* | (2006.01) |
| *B01J 20/10* | (2006.01) |
| *B01J 20/22* | (2006.01) |
| *B01J 20/12* | (2006.01) |
| *B01J 20/18* | (2006.01) |
| *B01J 20/02* | (2006.01) |
| *B01D 53/04* | (2006.01) |
| *B01J 20/28* | (2006.01) |

(52) U.S. Cl.
CPC .............. *B01J 20/20* (2013.01); *B01D 53/04* (2013.01); *B01D 53/64* (2013.01); *B01J 20/02* (2013.01); *B01J 20/0288* (2013.01); *B01J 20/041* (2013.01); *B01J 20/043* (2013.01); *B01J 20/046* (2013.01); *B01J 20/103* (2013.01); *B01J 20/12* (2013.01); *B01J 20/18* (2013.01); *B01J 20/22* (2013.01); *B01J 20/28004* (2013.01); *B01J 20/28016* (2013.01); *B01D 2251/304* (2013.01); *B01D 2251/402* (2013.01); *B01D 2251/404* (2013.01); *B01D 2253/102* (2013.01); *B01D 2253/25* (2013.01); *B01D 2257/602* (2013.01); *B01D 2258/0283* (2013.01)

(58) Field of Classification Search
CPC ..................................................... B01D 53/64
See application file for complete search history.

(56) References Cited

U.S. PATENT DOCUMENTS

| | | | |
|---|---|---|---|
| 1,984,164 | A | 12/1934 | Stock |
| 3,194,629 | A | 7/1965 | Dreibelbis et al. |
| 3,757,488 | A | 9/1973 | Austin et al. |
| 3,961,020 | A | 6/1976 | Seki |
| 4,174,373 | A | 11/1979 | Yoshida et al. |
| 4,196,173 | A | 4/1980 | deJong et al. |
| 4,215,096 | A | 7/1980 | Sinha et al. |
| 4,331,639 | A | 5/1982 | Hass et al. |
| 4,453,978 | A | 6/1984 | Okimura et al. |
| 4,474,896 | A | 10/1984 | Chao |
| 4,491,609 | A | 1/1985 | Degel et al. |
| 4,500,327 | A | 2/1985 | Nishino et al. |
| 4,708,853 | A | 11/1987 | Matviya et al. |
| 4,828,619 | A | 5/1989 | Matsushita et al. |
| 5,019,162 | A | 5/1991 | Suzuki et al. |
| 5,064,805 | A | 11/1991 | Otowa |
| 5,110,362 | A | 5/1992 | Hoarty et al. |
| 5,187,141 | A | 2/1993 | Jha et al. |
| 5,245,106 | A | 9/1993 | Cameron et al. |
| 5,286,292 | A | 2/1994 | Tsukada et al. |
| 5,322,778 | A | 6/1994 | Antrim et al. |
| 5,336,835 | A | 8/1994 | McNamara |
| 5,348,755 | A | 9/1994 | Roy |
| 5,424,077 | A | 6/1995 | Lajoie |
| 5,435,980 | A | 7/1995 | Felsvang et al. |
| 5,654,352 | A | 8/1997 | MacDonald |
| 5,658,547 | A | 8/1997 | Michalak et al. |
| 5,695,726 | A | 12/1997 | Lerner |
| 5,726,118 | A | 3/1998 | Ivey et al. |
| 6,126,910 | A | 10/2000 | Wilhelm et al. |
| 6,238,641 | B1 | 5/2001 | Hayden |
| 6,284,288 | B1 | 9/2001 | Gubelmann et al. |
| 6,514,906 | B1 | 2/2003 | Hayden |
| 6,521,037 | B1 | 2/2003 | Hurt et al. |
| 6,589,318 | B2 | 7/2003 | El-Shoubary et al. |

(Continued)

FOREIGN PATENT DOCUMENTS

| | | |
|---|---|---|
| CA | 2036746 A1 | 2/1992 |
| CN | 1388060 A | 1/2003 |

(Continued)

OTHER PUBLICATIONS

Anonymous: "Activated carbon—Wikipedia", Aug. 7 Retrieved from the Internet: URL:https://en.wikipedia.org/wiki/Activated_carbon[retrieved on Aug. 7, 2018].

(Continued)

*Primary Examiner* — Stuart L Hendrickson

(74) *Attorney, Agent, or Firm* — DLA Piper LLP (US)

(57) ABSTRACT

Methods and systems for reducing mercury emissions from fluid streams are provided herein, as are adsorbent materials having high volumetric iodine numbers.

2 Claims, 2 Drawing Sheets

(56) References Cited

U.S. PATENT DOCUMENTS

| | | |
|---|---|---|
| 6,638,347 B2 | 10/2003 | El-Shoubary et al. |
| 6,706,111 B1 | 3/2004 | Young |
| 6,719,828 B1 | 4/2004 | Lovell et al. |
| 6,783,585 B2 | 8/2004 | Zacarias et al. |
| 6,803,025 B2 | 10/2004 | Meserole et al. |
| 6,808,692 B2 | 10/2004 | Oehr |
| 6,818,043 B1 | 11/2004 | Chang et al. |
| 6,878,358 B2 | 4/2005 | Vosteen et al. |
| 6,890,507 B2 | 5/2005 | Chen et al. |
| 6,953,494 B2 | 10/2005 | Nelson, Jr. |
| 6,960,329 B2 | 11/2005 | Sellakumar |
| 7,273,524 B2 | 9/2007 | Tomita et al. |
| 7,404,940 B2 | 7/2008 | Higgins et al. |
| 7,435,286 B2 | 10/2008 | Olson et al. |
| 7,442,352 B2 | 10/2008 | Lu et al. |
| 7,514,052 B2 | 4/2009 | Lissianski et al. |
| 7,722,843 B1 | 5/2010 | Srinivasachar |
| 8,080,088 B1 | 12/2011 | Srinivasachar |
| 8,216,535 B2 | 7/2012 | Pollack et al. |
| 8,263,524 B1 | 9/2012 | Skandan et al. |
| 8,309,046 B2 | 11/2012 | Pollack et al. |
| RE44,124 E | 4/2013 | Lovell et al. |
| 8,409,330 B2 | 4/2013 | Pollack |
| 8,450,238 B2 | 5/2013 | Pollack et al. |
| 8,551,431 B1 | 10/2013 | Adams et al. |
| 8,679,430 B2 | 3/2014 | Pollack et al. |
| 8,715,599 B2 | 5/2014 | Pollack et al. |
| 8,834,606 B2 | 9/2014 | Pollack |
| 9,068,745 B2 | 6/2015 | Pollack et al. |
| 9,308,518 B2 | 4/2016 | Mimna et al. |
| 9,321,032 B1 | 4/2016 | Pollack et al. |
| 2001/0015359 A1 | 8/2001 | Benoist |
| 2003/0033930 A1 | 2/2003 | Tom et al. |
| 2003/0206843 A1 | 11/2003 | Nelson |
| 2004/0003716 A1 | 1/2004 | Nelson |
| 2004/0013589 A1 | 1/2004 | Vosteen et al. |
| 2004/0069186 A1 | 4/2004 | Zacarias et al. |
| 2004/0074391 A1 | 4/2004 | Durante et al. |
| 2004/0144287 A1 | 7/2004 | Tardif et al. |
| 2004/0200389 A1 | 10/2004 | Young |
| 2004/0206276 A1 | 10/2004 | Hill et al. |
| 2004/0220046 A1 | 11/2004 | Stockwell et al. |
| 2004/0244657 A1 | 12/2004 | Srinivasachar et al. |
| 2005/0019240 A1 | 1/2005 | Lu et al. |
| 2005/0039598 A1 | 2/2005 | Srinivasachar et al. |
| 2005/0147549 A1 | 7/2005 | Lissianski et al. |
| 2006/0048646 A1 | 3/2006 | Olson et al. |
| 2006/0051270 A1 | 3/2006 | Brunette |
| 2006/0090646 A1 | 5/2006 | Sawada et al. |
| 2006/0193763 A1 | 8/2006 | Cross et al. |
| 2006/0204418 A1 | 9/2006 | Chao et al. |
| 2006/0205592 A1 | 9/2006 | Chao et al. |
| 2006/0255494 A1 | 11/2006 | Ohtomo et al. |
| 2007/0041885 A1 | 2/2007 | Maziuk |
| 2007/0056479 A1 | 3/2007 | Gray |
| 2007/0056481 A1 | 3/2007 | Gray |
| 2007/0122327 A1 | 5/2007 | Yang et al. |
| 2007/0140941 A1 | 6/2007 | Comrie |
| 2007/0180990 A1 | 8/2007 | Downs et al. |
| 2007/0207923 A1 | 9/2007 | Lu et al. |
| 2007/0219404 A1 | 9/2007 | Matthews |
| 2007/0231230 A1 | 10/2007 | Meserole et al. |
| 2007/0234902 A1 | 10/2007 | Fair et al. |
| 2008/0116228 A1 | 5/2008 | Ryan et al. |
| 2008/0134888 A1 | 6/2008 | Chao et al. |
| 2008/0182747 A1 | 7/2008 | Sinha |
| 2008/0207443 A1 | 8/2008 | Gadkaree et al. |
| 2008/0219908 A1 | 9/2008 | Grochowski |
| 2008/0274874 A1 | 11/2008 | Heschel et al. |
| 2009/0007785 A1 | 1/2009 | Kimura et al. |
| 2009/0010828 A1 | 1/2009 | Holmes et al. |
| 2009/0056538 A1 | 3/2009 | Srinivasachar et al. |
| 2009/0081092 A1 | 3/2009 | Yang et al. |
| 2009/0136401 A1 | 5/2009 | Yang et al. |
| 2009/0235848 A1 | 9/2009 | Eiteneer et al. |
| 2010/0018395 A1 | 1/2010 | Srinivasachar et al. |
| 2010/0025302 A1 | 2/2010 | Sato et al. |
| 2010/0178624 A1 | 7/2010 | Srinivasachar |
| 2011/0048231 A1 | 3/2011 | Sinha |
| 2011/0076210 A1 | 3/2011 | Pollack et al. |
| 2011/0195003 A1 | 8/2011 | Durham et al. |
| 2011/0250110 A1 | 10/2011 | Keiser et al. |
| 2011/0250111 A1 | 10/2011 | Pollack et al. |
| 2011/0277846 A1 | 11/2011 | Brestovansky et al. |
| 2012/0085708 A1 | 4/2012 | Redding |
| 2012/0100053 A1 | 4/2012 | Durham et al. |
| 2012/0134903 A1 | 5/2012 | Brasseur et al. |
| 2012/0183458 A1 | 7/2012 | Olson et al. |
| 2012/0244355 A1 | 9/2012 | Pollack et al. |
| 2012/0263634 A1 | 10/2012 | Ergang et al. |
| 2013/0157845 A1 | 6/2013 | Nalepa et al. |
| 2013/0330257 A1 | 12/2013 | Tramposch |
| 2014/0205200 A1 | 7/2014 | Zeng |
| 2014/0224121 A1 | 8/2014 | Mimna et al. |
| 2015/0050202 A1 | 2/2015 | Filippelli et al. |
| 2016/0102019 A1 | 4/2016 | Pollack et al. |
| 2017/0056853 A1 | 3/2017 | Mimna et al. |
| 2017/0080402 A1 | 3/2017 | Tramposch et al. |

FOREIGN PATENT DOCUMENTS

| | | |
|---|---|---|
| CN | 104888713 A | 9/2015 |
| DE | 588531 C | 11/1933 |
| DE | 102007020422 A1 | 10/2008 |
| EP | 0289809 A1 | 11/1988 |
| EP | 2327921 A1 | 6/2011 |
| EP | 2858747 A1 | 4/2015 |
| GB | 1336241 A | 11/1973 |
| JP | 58020224 A | 2/1983 |
| JP | 61-118117 A | 6/1986 |
| JP | 62-213822 A | 9/1987 |
| JP | H-08178240 A | 7/1996 |
| JP | 2000038589 A | 2/2000 |
| JP | 2002331273 A | 11/2002 |
| JP | 2003038415 A | 2/2003 |
| JP | 2008240761 A | 10/2008 |
| JP | 4953591 B2 | 6/2012 |
| JP | 4953592 B2 | 6/2012 |
| JP | 2013-505832 A | 2/2013 |
| JP | 2013205360 A | 5/2013 |
| WO | 1993008902 A1 | 5/1993 |
| WO | 2000069991 A1 | 11/2000 |
| WO | 2001085307 A1 | 11/2001 |
| WO | 0393518 A1 | 11/2003 |
| WO | 2004089501 A2 | 10/2004 |
| WO | 2005092476 A1 | 10/2005 |
| WO | 2006039007 A2 | 4/2006 |
| WO | 2006101499 A1 | 9/2006 |
| WO | 2007112248 A2 | 10/2007 |
| WO | 2008064360 A2 | 5/2008 |
| WO | 2008143074 A1 | 11/2008 |
| WO | 2010042321 A1 | 4/2010 |
| WO | 2011127323 A2 | 10/2011 |
| WO | 2012030560 A1 | 3/2012 |
| WO | 2013063490 A1 | 5/2013 |
| WO | 2013188327 A1 | 12/2013 |
| WO | 2014082076 A1 | 5/2014 |
| WO | 2014126749 A1 | 8/2014 |
| WO | 2014205200 A1 | 12/2014 |

OTHER PUBLICATIONS

European Patent Application No. 13804633.9 Office Action dated Aug. 13, 2018.
B-PAC TM High Performance Mercury Sorbent, Jan. 1, 2004, retrieved from internet May 16, 2014 at https://www.albemrnrk.com.
Supplementary European Search Report for coresponding European Application No. 13804633 dated Feb. 1, 2016.
Chinese Office Action for corresponding Chinese Application No. 201380042764.0 dated Jan. 21, 2016.
Supplementary European Search Report in corresponding European Application No. 1413604.7 dated Jan. 30, 2017.

(56) References Cited

OTHER PUBLICATIONS

International Search Report and Written Opinion dated Oct. 28, 2014 in corresponding International Patent Application No. PCT/US2014/043158.
Raposo et al., Mercury Speciation in Fluorescence Lamps by Thermal Release Analysis (2003), Waste Management 23(10):879-886.
International Search Report and Written Opinion for PCT/US2016/033556 dated Aug. 26, 2016.
Change et al., Mercury emission control technologies: An EPRI synopsis, Power Engineering, Nov. 1, 1995, vol. 99, Issue 11, Penwell Corporation, Tulsa, OK, U.S.A. (24 pages).
Office of Inspector General "Evaluation Report: Additional Analyses of Mercury Emissions Needed Before EPA Finalizes Rules for Coal-Fired Electric Utilities" Report No. 2005-P-00003, Feb. 3, 2005, pp. 1-54.
International Search Report and Written Opinion for PCT/US2016/044745 dated Oct. 14, 2016.
Third Official Office Action dated Aug. 20, 2018 issued for Mexican Patent Application No. MX/a/2014/014943.
Albemarle Corporation Website, "B-PAC.TM. High Performance Mercury Sorbent" Jan. 1, 2004, retrieved from internet May 16, 2014 https://www.albermarle.com.
Bittner et al., "Triboelectrostatic Fly Ash Beneficiation: An Update on Separation Technologies," International Operations, pp. 1-69.
Campbell, et al., Mercury Control with Activated Carbon: Results from Plants with High $SO_3$, Paper #08-A-174-Mega-AWMA, pp. 1-17; Proceedings from the 2008 Power Plant Pollution Control "Mega" Symposium, Aug. 25-28, 2008, Baltimore, Maryland.
Colabella et al., "The Absorption and Subsequent Oxidation of AsH, and PH on Activated Carbon," J. of Crystal Growth (Oct. 1988), 92(1-2):189-195.
Dombrowski, "Evaluation of Low Ash Impact Sorbent Injection Technologies at a Texas Lignite/PRB Fired Power Plant," URS Corporation, pp. 1-27.
Feng et al., "Environmental Function Material," Chemical Industry Press, p. 136 (translation).
Ghorishi et al., "An Experimental Study of Mercury Sorption by Activated Carbons and Calcium Hydroxide," EPA Office of Research and Development, Air Pollution Prevention & Control Division, North Carolina pp. 1-17 (1998).
Gleiser et al., "Control of Mercury from MSW Combustors by Spray Dryer Absorption Systems and Activated Carbon Injection," Proceedings of an International Specialty Conference, Williamsburg, Virginia, Mar. 1993, pp. 1-15.
Granite et al., "Novel Sorbents for Mercury Removal from Flue Gas," Indus. & Engin. Chem. Res. (Apr. 2000), 39(4):1020-1029.
Hall et al., "Sorption of Phosphine by Activated Carbon Cloth and the Effects of Impregnation with Silver and Copper Nitrates and the Presence of Water" Carbon (1985), 23(4):353-371.
Hurt et al., "Strategies and Technology for Managing High-Carbon Ash" Brown University and University of Utah (Sep. 1, 2002-Feb. 28, 2003) pp. 1-13.
International Search Report and Written Opinion for PC T/US2014/014605 dated May 22, 2014.
International Search Report and Written Opinion for PCT/US2007/064579 dated Oct. 25, 2007.
International Search Report and Written Opinion for PCT/US2010050598 dated Jun. 27, 2011.
International Search Report and Written Opinion for PCT/US2011/031638 dated Dec. 28, 2011.
International Search Report and Written Opinion for PCT/US2013/045061 dated Oct. 11, 2013.
Japanese Office Action from counterpart application JP 2012-532246 dated Nov. 19, 2013.
Jarvis, et al., $SO_3$ Removal as a Mercury Control Strategy: Reducing $SO_3$ helps control mercury emissions and can boost plant efficiency and decrease operating costs, Power Industry Services (2008), 1-9.
Laflesh et al., "Progress Report on Mercury Control Retrofit at the Colstrip Power Station, Paper #91," Aug. 30-Sep. 2, 2010, Presented at A&WMA's Power Plant Air Pollutant Control MEGA Symposium in Baltimore, MD, 1-23.
Laine et al., "Effect of the preparation method on the pore size distribution of activated carbon from coconut shell," Carbon (1992), 30(4):601-604.
Lee et al., "Gas Phase Mercury Removal by Carbon-Based Sorbents," Fuel Processing Tech. (2003), 84:197-206.
Li et al., "Mercury Emissions Control in Coal Combustion Systems Using Potassium Iodide: Bench-Scale and Pilot-Scale Studies," Energy & Fuels (Jan. 5, 2009), 23:236-243.
Looney, et al., Activated Carbon Injection with $SO_3$ Flue Gas Conditioning Test at Gulf Power's Mercury Research Center, Paper #78, pp. 1-7; Proceedings from the 2008 Power Plant Pollution Control "Mega" Symposium, Aug. 25-28, 2008, Baltimore, Maryland.
Lou et al. "Stability of Mercury on Three Activated Carbon Sorbents" Fuel Processing Tech. (2006), 87:679-685.
Macias-Perez, et al., $SO_2$ retention on Cao/activated carbon sorbents. Part II: Effect of the activated carbon support, Fuel (Feb. 20, 2008), 87(12):2544-2550.
Mullett et al., "Removal of Elemental Mercury from Bayer Stack Gases Using Sulfur-Impregnated Activated Carbons," Chem. Eng. J. (2012), pp. 133-142.
Muthu et al., "An Evaluation of Impregnated Respirator Canister Carbons for Phosphine Removal from Air," Pestic. Sci. (1974), 5:245-249.
Nelson Jr. et al., "Accumulated Power-Plant Mercury-Removal Experience with Brominated PAC Injection Paper #95", Aug. 30, 2004, Retrieved from Internet on May 15, 2014 at URL:http://www.netl.doe.gov/Filelibrary/Research/Coal/ewr/mercury/Mega2-4-1990.pdf.
Office Action for corresponding Japanese Patent Application No. 2013-503964 dated May 27, 2014.
Paradis, "Impact of Mercury Sorbents on Fly Ash Use for Cement Replacement" Paper #164, URS Corporation, pp. 1-120.
Pollack, "Sorbent Injection: Taking the Technology from R&D to Commercial Launch," Paper #188, Calgon Carbon Corporation, p. 1-24.
Presto, et al., Further Investigation of the Impact of Sulfur Oxides on Mercury Capture by Activated Carbon, Ind. Eng. Chem. Res. (Nov. 2, 2007), 46(24):8273-8276.
Presto, et al., Impact of Sulfur Oxides on Mercury Capture by Activated Carbon, Environ Sci. Technol. (Sep. 15, 2007), 41(18):6579-6584.
Sontheimer et al., "Evaluation Methods Utilizing Aqueous Solutions, in Activated Carbon for Water Treatment," 1988, p. 100-103.
Strivastava et al., "Control of Mercury Emissions from Coal-Fired Electric Utility Boilers", Mar. 1, 2006, Retrieved from Internet on May 15, 2014 at URL:http://pubs.acs.org/doi/pdf/10.1021/es062639u.
Strivastava, "Control of Mercury Emissions from Coal Fired Electric Utility Boilers: An Update," Feb. 2010, Retrieved from Internet on May 16, 2014 at URL:http://nepis.epa.gov/Adobe/PDF/P1006LCB.pdf.
Supplementary European Search Report for corresponding European Patent Application No. 11 76 6760 dated May 21, 2014.
Supplementary European Search Report and Written Opinion for EP 10819662 dated Feb. 26, 2013.
Supplementary European Search Report and Written Opinion for EP 14751874 dated Sep. 12, 2016.
Supplementary European Search Report and Written Opinion for EP 13804633 dated Feb. 1, 2016.
U.S. Environmental Protection Agency, Case Study 11: Ash Fuel Reburn and Beneficiation at We Energies (Dec. 2003).
Uddin et al., "Rose of SO2 for Elemental Mercury Removal from Coal Combustion Flue Gas by Activated Carbon," Energy & Fuels (2008), 22(4):2284-2289.
White et al. "Parametric Evaluation of Powdered Activated Carbon Injection for Control of Mercury Emissions from a Municipal Waste Combustor," Paper No. 92-40.06, 1992 Annual Meeting, Air and Waste Management Association, Kansas City, Missouri, Jun. 1992.

(56) References Cited

OTHER PUBLICATIONS

Wirling, "Process Optimisation of Quasi-Dry Waste Gas Cleaning with Integrated Dioxin and Furan Adsorption," (Sep. 2001) Presented at Pollutant Control Symposium—Solutions in Dioxin and Mercury Reduction, University of Alicante 1-13.

Wirling, "Sicherheitstechnische Aspekte bei der Anwendung von kohlenstoffhaltigen Sorbentien zur Flugstromadsorption," (2006) Technik + Trends 126(6):47-54 (translated title—Safety Aspects in the Use of Carbonaceous Sorbents for Entrained-PhaseAdsorption).

Yan et al., "Bench-Scale Experimental Evaluation of Carbon Performance on Mercury Vapour Adsorption," Fuel (2004), 83:2401-2409.

Boehm et al, Activation of Carbon Catalysts for Oxidation Reactions . . . , Journal de Chimie Physique, 84:1449-1455 (1987), Abstract.

Database WPI Week 197450, Dement Publications Ltd., London, GB: AN 1974-86197V, XP002454207.

Database WPI8 Week 197450, Derwent Publications Ltd., London, GB; AN 1974-86198V, XP002454206.

Wang et al. "An Appraisal of the Surface Chemistry and Catalytic Oxidative Activity of the Nitrogen-Modified Activated Carbon by XPS" Cuihva Xuebao, 10(4):357-364 (1989) (Abstract).

Product Bulletin for Calgon Carbon Corporation entitled "HGR® 4×10 for Mercury Removal, Granular Activated Carbon", 2013 (1 page).

SORBENTS FOR REMOVAL OF MERCURY

CROSS-REFERENCE TO RELATED APPLICATIONS

This application is a divisional of U.S. application Ser. No. 15/368,900 entitled "Sorbents For Removal of Mercury" which was filed on Dec. 5, 2016 which is a continuation of U.S. application Ser. No. 13/841,315 entitled "Sorbents For Removal of Mercury" which was filed on Mar. 15, 2013 which claims priority to U.S. Provisional Application No. 61/658,258, entitled, "Sorbents for Removal of Mercury," filed Jun. 11, 2012, each of which is incorporated herein by reference in its entirety.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Mercury is a known environmental hazard and leads to health problems for both humans and non-human animal species. Approximately 50 tons per year are released into the atmosphere in the United States, and a significant fraction of the release comes from emissions from coal burning facilities such as electric utilities. To safeguard the health of the public and to protect the environment, the utility industry is continuing to develop, test, and implement systems to reduce the level of mercury emissions from its plants. In the combustion of carbonaceous materials, it is desirable to have a process wherein mercury and other undesirable compounds are captured and retained after the combustion phase so that they are not released into the atmosphere.

One of the most promising solutions for mercury removal from flue gas is Activated Carbon Injection (ACI). Activated carbon is a highly porous, non-toxic, readily available material that has a high affinity for mercury vapor. This technology is already established for use with municipal incinerators. Although the ACI technology is effective for mercury removal, the short contact time between the activated carbon and the flue gas stream results in an inefficient use of the full adsorption capacity of the activated carbon. Mercury is adsorbed while the carbon is conveyed in the flue gas stream along with fly ash from the boiler. The carbon and fly ash are then removed by a particulate capture device such as an Electrostatic Precipitator (ESP) or baghouse.

SUMMARY OF THE INVENTION

Various embodiments are directed to a mercury adsorptive material comprising an adsorptive material having a volumetric iodine number of greater than 450 mg/cc based on the gravimetric iodine number determined using standard test method (ASTM) D-4607 or an equivalent thereof and the apparent density determined using (ASTM) D-2854 or an equivalent thereof. In some embodiments, the volumetric iodine number is about 500 mg/cc to about 650 mg/cc. The adsorptive material can be any material known in the art including, but not limited to activated carbon, reactivated carbon, graphite, graphene, carbon black, zeolite, silica, silica gel, clay, and combinations thereof. In some certain embodiments, the adsorptive material has a mean particle diameter (MPD) of about 1 µm to about 30 µm. In particular embodiments, the mercury adsorptive material may include one or more oxidizing agent, such as, but not limited to, chlorine, bromine, iodine, ammonium bromide, ammonium chloride, calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, potassium tri-chloride, potassium tri-bromide, potassium tri-iodide, and combinations thereof, and the one or more oxidizing agent may be about 5 wt. % to about 50 wt. % of a total adsorptive material. In certain embodiments, the mercury adsorptive material may include one or more nitrogen source such as, for example, ammonium containing compounds, ammonia containing compounds, amines containing compounds, amides containing compounds, imines containing compounds, quaternary ammonium containing compounds, and combinations thereof, and the one or more nitrogen source may be about 5 wt. % to about 50 wt. % of a total adsorptive material. In some embodiments, the one or more nitrogen source may be ammonium iodide, ammonium bromide, or ammonium chloride, amine halides, a quaternary ammonium halides, organo-halides, and combinations thereof. In further embodiments, the mercury adsorptive material may include an alkaline agent such as, but not limited to, calcium carbonate, calcium oxide, calcium hydroxide, magnesium carbonate, magnesium hydroxide, magnesium oxide, sodium carbonate, sodium bicarbonate, trisodium hydrogendicarbonate dihydrate, and combinations thereof, and the alkaline agent may be provided at a concentration of greater than or equal to about 0.15 equivalents per 100 grams of absorptive material.

Other embodiments are directed to a system for removing mercury from flue gas including an adsorptive material having a volumetric iodine number of greater than 450 mg/cc based on the gravimetric iodine number determined using standard test method (ASTM) D-4607 or an equivalent thereof and the apparent density determined using (ASTM) D-2854 or an equivalent thereof. In some embodiments, the volumetric iodine number is about 500 mg/cc to about 650 mg/cc. The system can be any material known in the art including, but not limited to activated carbon, reactivated carbon, graphite, graphene, zeolite, silica, silica gel, clay, and combinations thereof. In some certain embodiments, the adsorptive material has a mean particle diameter (MPD) of about 1 µm to about 30 µm. In particular embodiments, the system may include one or more oxidizing agent, such as, but not limited to, chlorine, bromine, iodine, ammonium bromide, ammonium chloride, calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, potassium tri-chloride, potassium tri-bromide, potassium tri-iodide, and combinations thereof, and the one or more oxidizing agent may be about 5 wt. % to about 50 wt. % of a total adsorptive material. In certain embodiments, the system may include one or more nitrogen source such as, for example, ammonium containing compounds, ammonia containing compounds, amines containing compounds, amides containing compounds, imines containing compounds, quaternary ammonium containing compounds, and combinations thereof, and the one or more nitrogen source may be about 5 wt. % to about 50 wt. % of a total adsorptive material. In some embodiments, the one or more nitrogen source may be ammonium iodide, ammonium bromide, or ammonium chloride, amine halides, a quaternary ammonium halides, organo-halides, and combinations thereof. In further embodiments, the system may include an alkaline agent such as, but not limited to, calcium carbonate, calcium oxide, calcium hydroxide, magnesium carbonate, magnesium hydroxide, magnesium oxide, sodium carbonate, sodium bicarbonate, trisodium hydrogendicarbonate dihydrate, and combinations thereof, and the alkaline agent may be provided at a concentration of greater than or equal to about 0.15 equivalents per 100 grams of absorptive material.

Further embodiments are directed to a method for mercury removal including the step of injecting an adsorptive material having a volumetric iodine number of greater than 450 mg/cc based on the gravimetric iodine number determined using standard test method (ASTM) D-4607 or an equivalent thereof and the apparent density determined using (ASTM) D-2854 or an equivalent thereof into a flue gas stream. In some embodiments, the adsorptive material may have a volumetric iodine number is about 500 mg/cc to about 650 mg/cc. The adsorptive material may be, for example, activated carbon, reactivated carbon, graphite, graphene, zeolite, silica, silica gel, clay, and combinations thereof and may have a mean particle diameter (MPD) of about 1 µm to about 30 µm. The adsorptive material may further include any of the additives described above.

DESCRIPTION OF DRAWINGS

In the following detailed description, reference is made to the accompanying drawings, which form a part hereof. In the drawings, similar symbols typically identify similar components unless context dictates otherwise. The illustrative embodiments described in the detailed description, drawings, and claims are not meant to be limiting. Other embodiments may be utilized and other changes may be made, without departing from the spirit or scope of the subject matter presented herein. It will be readily understood that the aspects of the present disclosure, as generally described herein and illustrated in the Figures, can be arranged, substituted, combined, separated, and designed in a wide variety of different configurations, all of which are explicitly contemplated herein.

DETAILED DESCRIPTION

Figure 1:
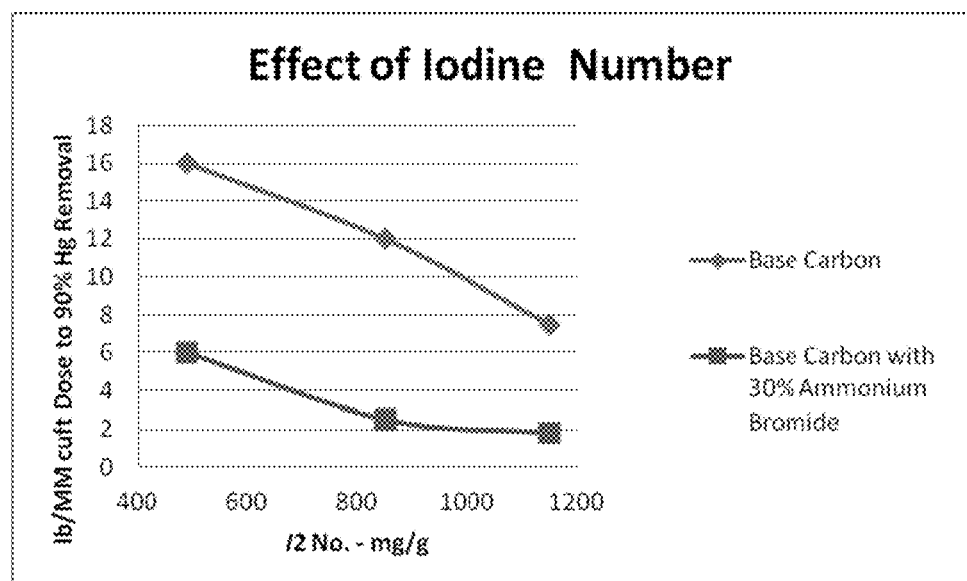
FIG. 1 is a graph showing the relationship between gravimetric iodine number and adsorption of mercury.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

Embodiments of the invention are directed to mercury sorbents having enhanced mercury removal capabilities in flue gas streams. Such mercury sorbents have include a mercury adsorptive material having an iodine number of greater than 300 mg/g, and in other embodiments, the mercury adsorptive material may have an iodine number from about 700 mg/g to about 1500 mg/g. In still other embodiments, these mercury sorbents may include one or more additives that may further enhance the effectiveness of the mercury adsorptive material.

The mercury adsorptive material of the sorbent composition of various embodiments may include any material having an affinity for mercury. For example, in some embodiments, the mercury adsorptive material may be a porous sorbent having an affinity for mercury including, but not limited to, activated carbon, reactivated carbon, graphite, graphene, zeolite, silica, silica gel, clay, and combinations thereof, and in particular embodiments, the mercury adsorptive material may be activated carbon. The mercury adsorptive material may have any mean particle diameter (MPD). For example, in some embodiments, the MPD of the mercury adsorptive material may be from about 0.1 µm to about 100 µm, and in other embodiments, the MPD may be about 1 µm to about 30 µm. In still other embodiments, the MPD of the mercury adsorptive material may be less than about 15 µm, and in some particular embodiments, the MPD may be about 2 µm to about 10 µm, about 4 µm to about 8 µm, or about 5 µm or about 6 µm. In certain embodiments, the mercury adsorptive materials may have an MPD of less than about 12 µm, or in some embodiments, less than 7 µm, which may provide increased selectivity for mercury oxidation.

In certain embodiments, the mercury adsorbent may have high activity as determined by having an iodine number of greater than 300 mg/g. Iodine number is used to characterize the performance of adsorptive materials based on the adsorption of iodine from solution. This provides an indication of the pore volume of the adsorbent material. More specifically, iodine number is defined as the milligrams of iodine adsorbed by one gram of carbon when the iodine concentration in the residual filtrate is 0.02 normal. Greater amounts of adsorbed iodine indicates that the activated carbon has a higher surface area for adsorption and a higher degree of activation activity level. Thus, a higher "iodine number" indicates higher activity. As used herein, the term "iodine number" can refer to either a gravimetric iodine number or a volumetric iodine number. Gravimetric iodine number can be determined using standard test method (ASTM) D-4607, which is hereby incorporated by reference in its entirety, or equivalent thereof. Volumetric iodine number is a product of the gravimetric iodine number (mg of iodine adsorbed/gram of carbon) and the apparent density of the activated carbon (grams of carbon/cc of carbon), which an apparent density can be determined using ASTM D-2854, which is hereby incorporated by reference in its entirety, or an equivalent thereof. In other embodiments, granular or powdered carbon or any other form of carbon where the ASTM apparent density test cannot properly be applied, the apparent density can be determined using mercury porosimetry test ASTM 4284-12 to determine the void volume via mercury intrusion volume at 1 pound per square inch actual pressure. This intrusion volume defines the void volume of the carbon sample to allow calculation of the carbon particle density, and the apparent density is then calculated by correcting this particle density for the void fraction in a dense packed container of the carbon sample. The void fraction is 40% for a typical 3 fold range in particle size for the sample. Thus, Calculated Apparent Density (g.Carbon/cc.Carbon container)=Particle Density (g.carbon/cc.carbon particle volume)*(100%−40% voids)/100%. The result is a volume based activity with the units of mg of iodine adsorbed per cc of carbon.

Adsorbent materials typically used for mercury adsorption have an iodine number, based on the gravimetric iodine number, of about 300 mg/g to about 400 mg/g, which is thought to provide equivalent performance in mercury adsorption characteristics to adsorptive materials having higher iodine numbers. Various embodiments of the invention are directed to mercury sorbents that include adsorbent materials having gravimetric iodine number for greater than 400 mg/g, greater than 500 mg/g, greater than 600 mg/g, greater than 700 mg/g, greater than 800 mg/g, greater than 900 mg/g, and so on or any gravimetric iodine number therebetween. In other embodiments, the adsorptive material may have an iodine number of from about 500 mg/g to about 1500 mg/g, about 700 mg/g to about 1200 mg/g, or about 800 mg/g to about 1100 mg/g, or any gravimetric iodine number between these exemplary ranges. In further embodiments, mercury adsorbents exhibiting an iodine number within these exemplary ranges may be an activated carbon or carbonaceous char.

As determined using volumetric iodine number methods, adsorbent materials for mercury adsorption may have a volumetric iodine number from about 350 mg/cc to about 800 mg/cc. In embodiments of the invention described herein, the volumetric iodine number may be greater than 400 mg/cc, greater than 500 mg/cc, greater than 600 mg/cc, greater than 700 mg/cc, and so on or any volumetric iodine number therebetween. In other embodiments, the adsorptive material may have a volumetric iodine number of from about 350 mg/cc to about 650 mg/cc, about 400 mg/cc to about 600 mg/cc, about 500 mg/cc to about 600 mg/cc, about 500 mg/cc to about 700 mg/cc, or any volumetric iodine number between these ranges. In further embodiments, mercury adsorbents exhibiting an iodine number within these exemplary ranges may be an activated carbon or carbonaceous char, and in certain embodiments, these activated carbon or carbonaceous chars exhibiting a volumetric iodine number of 400 mg/cc or greater may be combined with activated carbons and carbonaceous chars exhibiting a volumetric iodine number that is less than 400 mg/cc.

Without wishing to be bound by theory, adsorbent materials having an iodine number within these exemplary ranges may provide improved adsorption over adsorbent materials having a gravimetric iodine number within the commonly used range of about 300 mg/g to about 400 mg/g. For example, in certain embodiments, about one half as much activated carbon having a gravimetric iodine number between about 700 mg/g to about 1200 mg/g or a volumetric iodine number of about 500 mg/cc to about 2200 mg/cc may be necessary to adsorb the amount of mercury adsorbed by conventional activated carbon. Thus, certain embodiments, are directed to methods in which about 5 lbs/hr to about 10 lbs/hr of activated carbon having an iodine number of from about 700 mg/g to about 1200 mg/g or a volumetric iodine number of about 500 mg/cc to about 2200 mg/cc can adsorb an equivalent amount of mercury as about 15 lbs/hr of an activated carbon having an gravimetric iodine number of about 500 mg/g (see, Example 1).

In still other embodiments, any of the adsorptive materials described above may be treated with one or more oxidizing agents that enhance mercury adsorption. For example, in some embodiments, the oxidizing agent may be a halogen salt including inorganic halogen salts, which for bromine may include bromides, bromates, and hypobromites, for iodine may include iodides, iodates, and hypoiodites, and for chlorine may be chlorides, chlorates, and hypochlorites. In certain embodiments, the inorganic halogen salt may be an alkali metal or an alkaline earth element containing halogen salt where the inorganic halogen salt is associated with an alkali metal such as lithium, sodium, and potassium or alkaline earth metal such as magnesium, and calcium counterion. Non-limiting examples of inorganic halogen salts including alkali metal and alkali earth metal counterions include calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, potassium tri-chloride, potassium tri-bromide, potassium tri-iodide, and the like. The oxidizing agents may be included in the composition at any concentration, and in some embodiments, no oxidizing agent may be included in the compositions embodied by the invention. In embodiments in which oxidizing agents are included, the amount of oxidizing agent may be from about 5 wt. % or greater, about 10 wt. % or greater, about 15 wt. % or greater, about 20 wt. % or greater, about 25 wt. % or greater, about 30 wt. % or greater, about 40 wt. % or greater of the total sorbent, or about 5 wt. % to about 50 wt. %, about 10 wt. % to about 40 wt. %, about 20 wt. % to about 30 wt. %, or any amount therebetween.

In further embodiments, any of the adsorptive materials described above may be treated with one or more nitrogen source. The nitrogen source of such agents may be any nitrogen sources are known in the art and can include, for example, ammonium, ammonia, amines, amides, imines, quaternary ammonium, and the like. In certain embodiments, the agent may be, for example, chlorine, bromine, iodine, ammonium halide, such as, ammonium iodide, ammonium bromide, or ammonium chloride, an amine halide, a quaternary ammonium halide, or an organo-halide and combinations thereof. In some embodiments, the nitrogen containing agent may be ammonium halide, amine halide, or quaternary ammonium halide, and in certain embodiments, the agent may be an ammonium halide such as ammonium bromide. In various embodiments, the nitrogen containing agent may be provided about 5 wt. % or greater, about 10 wt. % or greater, about 15 wt. % or greater, about 20 wt. % or greater, about 25 wt. % or greater, about 30 wt. % or greater, about 40 wt. % or greater of the total sorbent, or about 5 wt. % to about 50 wt. %, about 10 wt. % to about 40 wt. %, about 20 wt. % to about 30 wt. %, or any amount therebetween.

The ammonium halide, amine halide, or quaternary ammonium halide may be absent in some embodiments, in other embodiments, the ammonium halide, amine halide, or quaternary ammonium halide may be the only additive included in the sorbent composition, and in still other embodiments, the ammonium halide, amine halide, or quaternary ammonium halide may be combined with other agents such as, for example, halide salts, halide metal salts, alkaline agents, and the like to prepare a composition or sorbent encompassed by the invention. In particular embodiments, sorbent may include at least one of a halogen salt such as sodium bromide (NaBr), potassium bromide (KBr), or ammonium bromide ($NH_4Br$).

In some embodiments, the adsorbent material may be combined with an acid gas suppression agent such as, for example, alkaline agent. Numerous alkaline agents are known in the art and currently used to remove sulfur oxide species from flue gas and any such alkaline agent may be used in the invention. For example, in various embodiments, the alkaline additive may be alkali oxides, alkaline earth oxides, hydroxides, carbonates, bicarbonates, phosphates, silicates, aluminates, and combinations thereof, and in certain embodiments, the alkaline agent may be calcium carbonate ($CaCO_3$; limestone), calcium oxide (CaO; lime), calcium hydroxide ($Ca(OH)_2$; slaked lime); magnesium carbonate ($MgCO_3$; dolomite), magnesium hydroxide ($Mg(OH)_2$), magnesium oxide (MgO), sodium carbonate ($Na_2CO_3$), sodium bicarbonate ($NaHCO_3$), trisodium hydrogendicarbonate dihydrate ($Na_3H(CO_3)_2.2H_2O$; trona), and combinations thereof. In various embodiments, the alkaline agent may be provided at a concentration greater than or equal to about 0.15 equivalents per 100 grams of absorptive material, wherein one equivalent of the alkaline agent is defined as the amount required to produce one mole of hydroxyl ions or to react with one mole of hydrogen ions. In particular embodiments, such alkaline agents may have a relatively high surface area such as, for example, above 100 $m^2/g$ for neat materials. High surface area materials may provide improved kinetics and capabilities for acid gas or $SO_x$ mitigation while complementing halogen compounds and other added oxidants to provide oxidation of elemental mercury. Because alkaline agents are highly polar materials that may associate and bond with water, in various embodiments, alkaline agents may be combined with the primary mercury sorbent as a physical admixture and may not generally be present on the sorbent surface or contained within the sorbent pore structure.

In other embodiments, the mercury adsorptive material may be treated to enhance the hydrophobicity of the adsorptive materials with, for example, one or more hydrophobicity enhancement agents that impede the adsorption and transport of water or other treatments of the sorbent that achieve similar results. Embodiments are not limited to the type of treated mercury adsorptive material or the means by which the mercury adsorptive material has been treated with a hydrophobicity enhancement agent. For example, in some embodiments, the mercury adsorptive material may be treated with an amount of one or more elemental halogen that can form a permanent bond with the surface. The elemental halogen may be any halogen such as fluorine (F), chlorine (Cl), or bromine (Br), and in certain embodiments, the elemental halogen may be fluorine (F). In other embodiments, the mercury adsorptive material may be treated with a hydrophobicity enhancement agent such as a fluorine salt, organo-fluorine compound, or fluorinated polymer, such as, TEFLON®.

In such embodiments, treatment may be effectuated by grinding the mercury adsorptive material with the organo-fluorine compound or fluorinated polymer. In still other embodiments, carbon sorbents used as the mercury adsorptive material may be treated with mineral acids such as but not limited to, hydrochloric acid, nitric acid, boric acid, and sulfuric acid, under high temperature, e.g., greater than about 400° C. or greater than 600° C. or greater than 800° C. The concentration of the acid is not critical to such treatments and concentrations as low as 1.0 percent by weight or less may be used. Without wishing to be bound by theory, such treatment may enhance hydrophobicity and decreased activity for the catalytic oxidation of sulfur dioxide to sulfuric acid in the presence of oxygen and water. Evidence of such treatments can be found in a high contact pH and a reduced tendency for the carbon alone to decompose hydrogen peroxide when compared to the same carbon without such treatments.

The adsorbent material may be combined with an oxidizing agent, nitrogen containing compound, hydrophobicity agent, acid gas suppression agent, or other mercury removal agent (collectively, "additives") in any way known in the art. For example, in some embodiments, the one or more additive may be introduced onto the surface of the adsorbent material by impregnation in which the adsorbent material is immersed in a liquid mixture of additives or the liquid mixture of additives is sprayed or otherwise applied to the adsorbent material. Such impregnation processes result in an adsorbent material in which the additives are dispersed on the surface of the adsorbent material.

In various other embodiments, treatment of the adsorbent material may be combined with one or more additive as a dry admixture in which particles of adsorbent are separated and apart from particles of additive having substantially the same size. For example, in some embodiments, may be provided by co-milling activated carbon with one or more additive to a mean particle diameter (MPD) of less than or equal to about 12 μm, less than or equal to about 10 μm, or less than about 7 μm. Without wishing to be bound by theory, reducing the mean particle diameter of the sorbent and additives by co-milling allows for a close localization of the sorbent and the additives, but the additives are not contained within the sorbent pore structure. These dry admixtures have been found to be surprisingly effective in facilitating rapid and selective mercury adsorption. This effect has been shown particularly effective when all of components of the sorbent are combined and co-milled or otherwise sized to a mean particle diameter of less than or equal to about 12 μm. Co-milling may be carried out by any means. For example, in various embodiments, the co-milling may be carried out using bowl mills, roller mills, ball mills, jet mills or other mills or any grinding device known to those skilled in the art for reducing the particle size of dry solids.

Although not wishing to be bound by theory, the small MPD may improve the selectivity of mercury adsorption as the halide effectively oxidizes the mercury. As such, dry admixtures of adsorbent materials and additive may allow for a higher percentage of active halide and alkaline agents to be included in the injected sorbent. Mercury adsorbents that are impregnated with an additive by treating with an aqueous solution of the additive, for example, commercial brominated carbon sorbents, especially those impregnated with elemental bromine, can only retain a small percentage of the additive on the surface of the adsorbent, and impregnation tends to clog the pores of porous mercury adsorbents reducing the surface area available for mercury adsorption. In contrast, the percentage of additive in a dry mixture may be greater than about 10 wt. %, greater than about 15 wt. %, greater than about 20 wt. %, or greater than about 30 wt. % and up to about 50 wt. %, up to about 60 wt. %, or up to about 70 wt. % without exhibiting a reduction in mercury adsorption efficiency.

While co-grinding is useful in some embodiments, adsorptive material and additives may be combined by any method. For example, in some embodiments, an adsorptive material and one or more additive may be combined by blending or mixing the materials into a single mercury sorbent that can then be injected into a flue gas stream. In other embodiments, combining may occur during use such that the adsorptive material and the one or more additive are held in different reservoirs and injected simultaneously into a flue gas stream.

Further embodiments are directed to methods for removing mercury from flue gas by injecting a mercury adsorbent including a mercury sorbent described above including an adsorbent material and one or more oxidizing agent, nitrogen containing compound, hydrophobicity agent, acid gas suppression agent, or other mercury removal agent into a flue gas stream. The sorbents described herein may be used to adsorb mercury in any flue gas stream. For example, the sorbents of various embodiments may be used in flue gas streams having no or extremely low $SO_3$ content or flue gas streams containing high concentrations of other acid gases such as HCl, HF, or $NO_x$ species.

In some embodiments, the mercury adsorptive material and one or more additive may be combined prior to injection into the flue gas stream by, for example, mixing or blending, the mercury adsorptive material with the one or more additives. In other embodiments, the mercury adsorptive material and one or more additives may be injected separately into the flue gas stream and combined in the flue gas stream itself. In still other embodiments, the mercury adsorbent material and the one or more additives may be introduced into a flue gas stream in different portions of the flue gas stream. For example, in some embodiments, all adsorbent materials and additives may be introduced into the flue gas stream simultaneously and at the same portion of the flue gas stream. In other embodiments, an additive such as, for example, a halide salt may be introduced into a boiler or a upstream portion of the flue gas stream and the adsorbent and one or more additional additives may be introduced into the flue gas stream either simultaneously or separately in one or more downstream portions of the flue gas stream.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

Activated carbons of various activity levels were investigated for their ability to remove mercury from flue gas. Activity was based on the gravimetric iodine number (ASTM D-4607) and volumetric iodine number which the gravimetric iodine number converted to a volumetric basis using the density of the granular material (ASTM D2854). Carbons were all approximately 7 μm in size and were injected into test flue gas upstream of the electrostatic precipitator (ESP) either alone or in a dry admixture with 30% w/w ammonium bromide. Results are reported based on lbs/hr required to remove 90% of the mercury in the flue gas stream.

Figure 2:
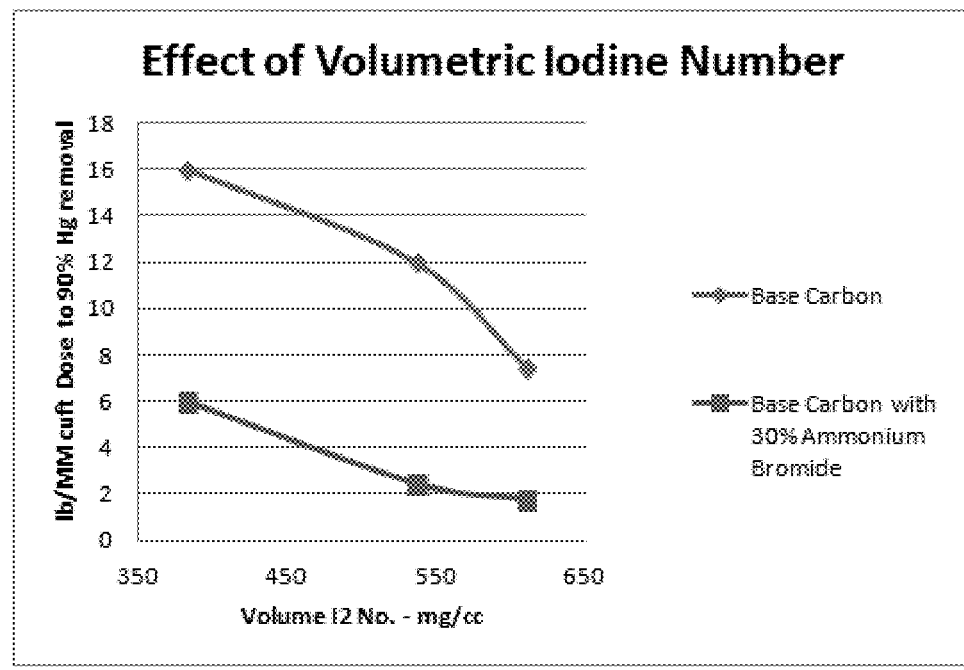
FIG. 2 is a graph showing the relationship between volumetric iodine number and adsorption of mercury for an adsorbent.

FIGS. 1 and 2 shows performance curves for base carbons (no additive) and the base carbon in a dry admixture of 30% w/w ammonium bromide. FIG. 1 shows the relationship of gravimetric iodine number (mg/g) to the amount of adsorbent required to reach 90% mercury removal, and FIG. 2 shows the relationship between volumetric iodine number (mg/cc) and the amount of adsorbent required to 90% mercury removal. Table 1 shows the apparent density and gravimetric iodine number used to calculate the volumetric iodine number.

TABLE 1

| Apparent Density (g/cc) | Gravimetric Iodine Number (mg/g) | Volumetric Iodine Number (mg/cc) |
| --- | --- | --- |
| 0.78 | 490 | 382 |
| 0.63 | 850 | 536 |
| 0.53 | 1150 | 610 |

As illustrated in FIGS. 1 and 2, 15.4 lbs/hr of carbon having an gravimetric iodine number of 462 mg/g and a volumetric iodine number of about 382 mg/cc is required to remove 90% of the mercury from the flue gas stream. In contrast, about 8.3 lbs/hr is required to remove 90% of the mercury from the flue gas stream with activated carbon having a gravimetric iodine number of 1150 mg/g and a volumetric iodine number of about 610 mg/cc. This provides an about 45% reduction in the amount of activated carbon required to remove 90% of the mercury from a flue gas stream when the activity as determined by iodine number is increased by 40%.

FIGS. 1 and 2 also show performance curves for carbons including 30% w/w additive (ammonium bromide) is combined with the activated carbon in a dry admixture before being injected into the flue gas upstream of the ESP. Initially, a 40% reduction in the amount of activated carbon (from 15.4 lbs/hr to 6.2 lbs/hr) necessary to remove 90% of the mercury from the flue gas stream was observed by the addition of ammonium bromide to the activated carbon having an gravimetric iodine number of 462 mg/g. The adsorption of mercury is further enhanced by the introduction of adsorbent having higher activity based on iodine number. Specifically, 1.8 lbs/hr of activated carbon is necessary to remove 90% of the mercury from the flue gas when activated carbon having a gravimetric iodine number of 1150 mg/g and a volumetric iodine number of about 610 mg/cc. This represents a 60% reduction in the amount of activated carbon necessary to reduce the amount of mercury in a full gas stream by 90%. Additionally, the performance curves resulting from activated carbon ammonium bromide mixtures exhibit a non-linear relationship which could be indicative of a synergetic interaction between ammonium bromide addition and both volumetric and gravimetric iodine activity.

FIG. 2 also shows a non-linear decrease in the amount of carbon required when the volumetric iodine number is above about 500 mg/cc when ammonium bromide is present as an admix. Additionally in FIG. 2. increasing the volume iodine value of the base carbon does not have a large effect on the performance of this material.

What is claimed is:

1. A method for removing mercury from a flue gas comprising:
   injecting an adsorptive material into a flue gas stream wherein the adsorptive material consists essentially of an activated carbon having a volumetric iodine number of about 525 mg/cc to about 610 mg/cc, wherein the adsorptive material has a mean particle diameter (MPD) of less than about 15 µm, wherein the volumetric iodine number is a product of the gravimetric iodine number (mg of iodine adsorbed/gram of carbon) and the apparent density of the activated carbon (grams of carbon/cc of carbon), wherein the gravimetric iodine number is determined using standard test method (ASTM) D-4607 and the apparent density is determined using (ASTM) D-2854.

2. A method for removing mercury from a flue gas comprising:
   injecting an adsorptive material into a flue gas stream wherein the adsorptive material consists essentially of an activated carbon having a volumetric iodine number of about 536 mg/cc to about 610 mg/cc, wherein the adsorptive material has a mean particle diameter (MPD) of less than about 15 µm, wherein the volumetric iodine number is a product of the gravimetric iodine number (mg of iodine adsorbed/gram of carbon) and the apparent density of the activated carbon (grams of carbon/cc of carbon), wherein the gravimetric iodine number is determined using standard test method (ASTM) D-4607 and the apparent density is determined using (ASTM) D-2854.

\* \* \* \* \*